United States Patent
Gutman et al.

(10) Patent No.: US 10,785,514 B1
(45) Date of Patent: Sep. 22, 2020

(54) CAMPAIGN ROUTER

(71) Applicant: WURL INC., Palo Alto, CA (US)

(72) Inventors: Ron Gutman, San Diego, CA (US);
Yuval Fisher, Palo Alto, CA (US);
Sarah Christine Foss, Denver, CO (US)

(73) Assignee: WURL INC., Palo Alto, CA (US)

( * ) Notice: Subject to any disclaimer, the term of this patent is extended or adjusted under 35 U.S.C. 154(b) by 0 days.

(21) Appl. No.: 16/352,878

(22) Filed: Mar. 14, 2019

(51) Int. Cl.
| H04N 21/2668 | (2011.01) |
| H04N 21/237 | (2011.01) |
| H04N 21/234 | (2011.01) |
| H04N 21/24 | (2011.01) |
| H04N 21/218 | (2011.01) |
| H04N 21/81 | (2011.01) |

(52) U.S. Cl.
CPC ....... *H04N 21/237* (2013.01); *H04N 21/2181* (2013.01); *H04N 21/23424* (2013.01); *H04N 21/2407* (2013.01); *H04N 21/2668* (2013.01); *H04N 21/812* (2013.01)

(58) Field of Classification Search
CPC .................................................. H04N 21/2668
See application file for complete search history.

(56) References Cited

U.S. PATENT DOCUMENTS

| 8,387,086 | B2 | 2/2013 | Agarwal et al. |
| 8,799,943 | B1 | 8/2014 | Sherwin et al. |
| 10,034,062 | B1 | 7/2018 | Flickinger |
| 2002/0184047 | A1 | 12/2002 | Plotnick et al. |
| 2008/0046924 | A1 | 2/2008 | Hood |
| 2010/0138290 | A1 | 6/2010 | Zschocke et al. |
| 2011/0302600 | A1 | 12/2011 | Kelsen et al. |
| 2012/0254456 | A1 | 10/2012 | Visharam et al. |
| 2013/0254041 | A1 | 9/2013 | Sherwin et al. |
| 2015/0120464 | A1* | 4/2015 | Zeigler .............. G06Q 30/0269 705/14.66 |
| 2015/0201229 | A1 | 7/2015 | Flickinger |
| 2015/0302487 | A1* | 10/2015 | Reynolds ........... G06Q 30/0277 705/14.73 |
| 2017/0188054 | A1 | 6/2017 | Ma et al. |
| 2017/0365295 | A1 | 12/2017 | Clem et al. |
| 2019/0174156 | A1* | 6/2019 | Crawford ......... H04N 21/23424 |

FOREIGN PATENT DOCUMENTS

WO    2013053038 A1    4/2013

\* cited by examiner

*Primary Examiner* — Michael H Hong
(74) *Attorney, Agent, or Firm* — Kligler & Associates Patent Attorneys Ltd

(57) ABSTRACT

A method of providing a video manifest to a client. A router manages, for each of a plurality of ad placement units, a measure of advertisement avails provided by the router to the ad placement unit for filling with advertisements, receives a client request for a video content, and chooses an ad placement unit from the plurality of ad placement units, to select advertisements to be placed in avails of the requested video content, at least partially responsive to the managed measures of advertisement avails. The received client request is directed to the chosen ad placement unit.

18 Claims, 1 Drawing Sheet

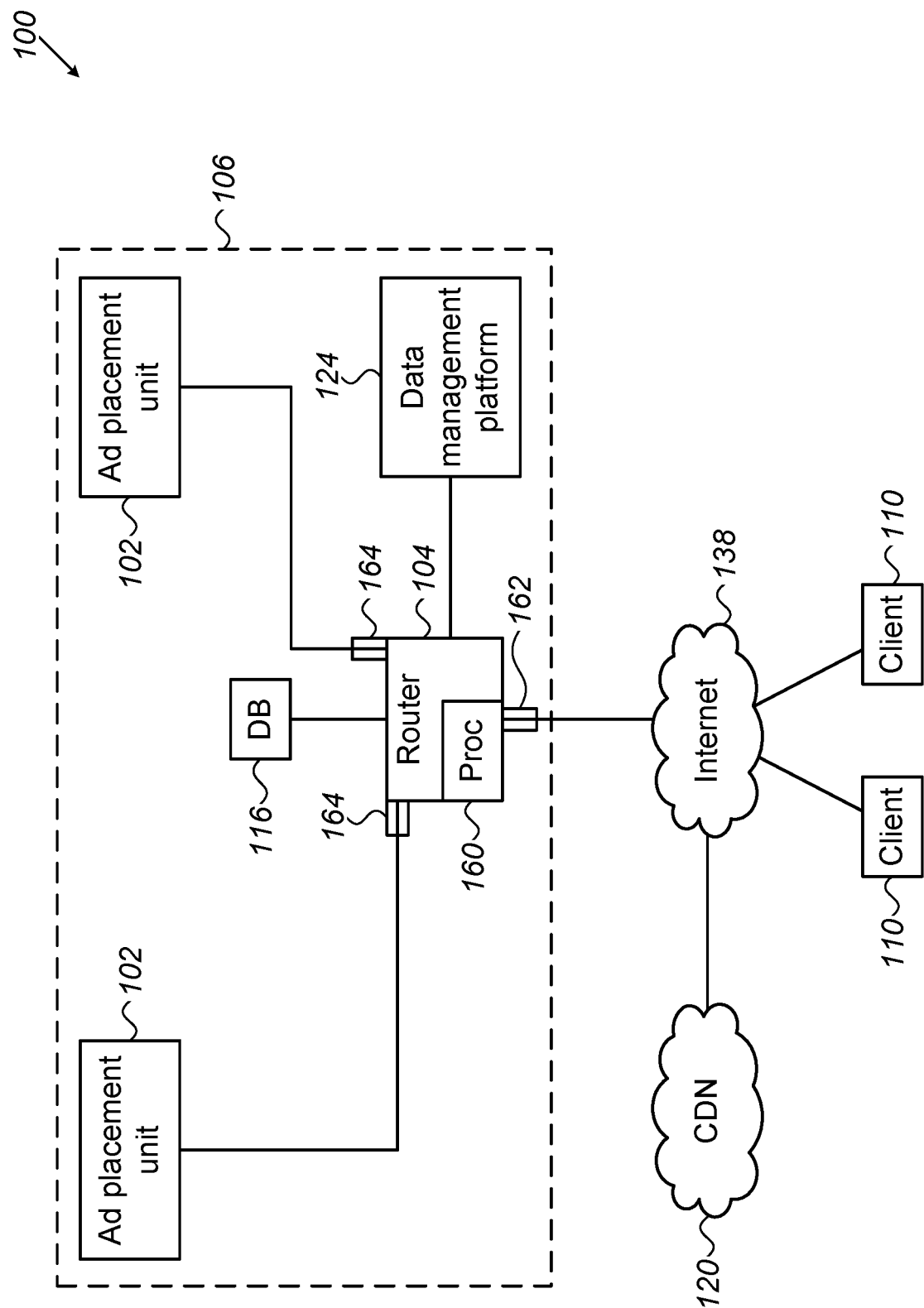

CAMPAIGN ROUTER

FIELD OF THE INVENTION

The present invention relates generally to video distribution, and particularly to monetization of distributed video via advertising.

BACKGROUND

Adaptive bitrate (ABR) video streams are used to deliver video streams to clients. When a client requests video content, the client is serviced with a manifest which includes a list of links, such as URL addresses, of files containing fragments of the requested video content. The manifest may include multiple links for a single fragment of the video content, corresponding to different bitrates and/or resolutions.

For pre-existing video assets, the manifest contains links to fragments covering the entire video asset. For real-time linear streams, the manifest may contain links to a sub-portion of the video asset, along with one or more links to further manifests to be requested by the client as the stream progresses. Alternatively, the manifest indicates a function used by the client to programmatically determine fragment URLs forward in time.

US Patent Publication 2017/0188054 to Ma et al., titled: "Method and System for Optimized Media Delivery", describes a system in which an origin server receives content requests from clients and generates a manifest file tailored to the clients location, so that the files indicated by the manifest are serviced from a local cache. The manifest is either returned to the client from the origin server or from the local cache.

An important source of revenue for the provided video content is insertion of advertisements in the video content. Video streams are designed with slots, also known as avails, to be filled in with advertisements when the stream is provided to a client. In some cases, the revenue from the advertisements is split between a content provider, providing the video content, and a video distributor (e.g., a cable operator), which delivers the video content to the viewers. A problem arises in how to split the slots or the revenue from the advertisements between the content provider and the video distributor.

U.S. Patent Publication 2013/0254041 to Sherwin et al., titled: "Method for Delivering Fair Advertising Inventory Splits Given Position Preferences", suggests splitting slots at random between the content provider and the cable operator, according to inventory split percentages.

US Patent Publication 2011/0302600 to Kelsen et al., titled: "Multicast Video Advertisement Insertion Using Routing Protocols" describes a method of inserting advertisements into a broadcast video, at local locations, without employing complex insertion units at these local locations.

SUMMARY

Embodiments of the present invention that are described hereinbelow provide methods and apparatus for splitting advertisement insertion between different ad placement units managed by the same entity or by different advertisement insertion entities.

There is therefore provided in accordance with embodiments of the invention, a method of providing a video manifest to a client, including managing, by a router, for each of a plurality of ad placement units, a measure of advertisement avails provided by the router to the ad placement unit for filling with advertisements, receiving, at the router, a client request for a video content, choosing, by the router, an ad placement unit from the plurality of ad placement units, to select advertisements to be placed in avails of the requested video content, at least partially responsive to the managed measures of advertisement avails, and directing the received client request to the chosen ad placement unit.

Optionally, managing the measure of advertisement avails comprises counting the number of requests directed to each of the ad placement units and/or counting the number of avails in the requests directed to each of the ad placement units. Alternatively or additionally, managing the measure of advertisement avails comprises counting the number of avails actually filled by each of the ad placement units.

Optionally, directing the received client request to the chosen ad placement unit comprises forwarding the client request from the router to the chosen ad placement unit. Optionally, directing the received client request to the chosen ad placement unit comprises sending to a client from which the client request was received, a redirection instruction to forward the client request to the chosen ad placement unit.

Optionally, each of the plurality of ad placement units is assigned a predefined proportion assigned to the ad placement unit and choosing the ad placement unit is responsive to the managed measures of advertisement avails and the assigned predefined proportions. Optionally, choosing the ad placement unit from the plurality of ad placement units comprises choosing the ad placement unit for which the managed measure is farthest from the assigned predefined proportion. Optionally, choosing the ad placement unit from the plurality of ad placement units comprises choosing responsive to current efficiency scores of the ad placement units.

Optionally, the current efficiency scores of the ad placement units are dependent on current income received by the ad placement units for filling avails. Optionally, the current efficiency scores of the ad placement units are dependent on measures of current load on the ad placement units. Optionally, choosing the ad placement unit from the plurality of ad placement units comprises choosing at least partially responsive to information on the user from which the request was received. Optionally, choosing the ad placement unit from the plurality of ad placement units comprises choosing in a manner giving preference to directing requests from a specific client to multiple ad placement units. Optionally, the method includes modifying a format of the received client request, before directing the received client request to the chosen ad placement unit.

There is further provided in accordance with embodiments of the invention, an apparatus for providing a video manifest to a client, comprising at least one interface for communicating with a plurality of clients and a plurality of ad placement units, a router configured to manage for each of the plurality of ad placement units, a measure of advertisement avails provided by the router to the ad placement unit for filling with advertisements, to receive requests for video content from the clients, to choose for each received request an ad placement unit from the plurality of ad placement units, to handle the request, at least partially responsive to the managed measures of advertisement avails; and to direct the received client request to the chosen ad placement unit.

Optionally, the router is configured to direct the received client request to the chosen ad placement unit by forwarding the client request from the router to the chosen ad placement unit. Optionally, the router is configured to direct the received client request to the chosen ad placement unit by sending to a client from which the client request was received, a redirection instruction to forward the client request to the chosen ad placement unit. Optionally, the router is configured to modify a format of the received client request, so as to match a format expected by the chosen ad placement unit, before directing the received client request to the chosen ad placement unit. Optionally, the router is configured to choose the ad placement unit from the plurality of ad placement units at least partially responsive to information on the user from which the request was received. Optionally, the router is configured to choose the ad placement unit from the plurality of ad placement units in a manner giving preference to directing requests from a specific client to multiple ad placement units.

The present invention will be more fully understood from the following detailed description of the embodiments thereof, taken together with the drawings in which:

BRIEF DESCRIPTION OF THE DRAWINGS

FIG. 1 is a video provision system, in accordance with an exemplary embodiment of the invention.

DETAILED DESCRIPTION OF EMBODIMENTS

An aspect of some embodiments of the present invention relates to a system for placing advertisement links in video manifests. The system includes a plurality of ad placement units, which insert advertisement links into manifests, and a router, which distributes video requests between the ad placement units according to a predefined rule on splitting the video requests between the ad placement units.

The splitting of the advertisement insertion between different ad placement units allows separate placement of advertisements by different entities without the entities exposing their advertisement strategies to each other. In some embodiments, the different ad placement units use different rules and/or different targeting metadata in selecting the advertisements to be placed in the avails.

FIG. 1 is a schematic illustration of a video provision system 100, in accordance with an embodiment of the invention. System 100 includes a manifest provision system 106, and a content distribution network (CDN) 120. Clients 110 send requests for video content (e.g., video playback requests), over the Internet 138 or any other suitable network, to manifest provision system 106. Manifest provision system 106 responds to each request with a corresponding manifest listing video data blocks forming the requested video content. Client 110 then retrieves the video content blocks from CDN 120.

Manifest provision system 106 comprises a plurality of ad placement units 102 and a router 104. Client requests directed to manifest provision system 106 are directed to router 104, which chooses for each client request an ad placement unit 102 to handle the request, according to one or more predefined rules on splitting the video requests between the ad placement units 102. The requests are then forwarded to the chosen ad placement unit 102. Ad placement units 102 retrieve a manifest listing video blocks corresponding to the requested video content, select advertisements to be provided in avails of the retrieved manifest and insert the selected advertisements to the avails of the manifest. The manifest is then provided to the client 110 using any of the methods discussed hereinbelow.

The advertisement selection is optionally performed in each ad placement unit 102 by an internal advertisement decision server (ADS). The ADS receives targeting metadata and accordingly selects advertisements to be placed in the avails of the video content. The targeting metadata optionally includes information on the content of the video stream, demographic information on the viewers receiving the video stream, and/or information on what the viewers previously viewed. The insertion of the advertisements into the avails is optionally performed by a suitable manifest manipulator (MM). The manifest manipulator operates using any suitable method known in the art, such as any of the methods described in U.S. Pat. No. 8,799,943, titled: "Method and System for Efficient Manifest Manipulation", which is incorporated herein by reference in its entirety.

The manifest provided by the ad placement unit 102, optionally covers the entire requested video content. This option may be used, for example, when the requested video content is a stored video, such as in a video on demand (VOD) service. Alternatively, the provided manifest covers only a short segment of the requested video, for example covering several seconds. To receive further segments of the requested video, the client optionally resends the request and receives a manifest corresponding to a subsequent segment of the video content. Alternatively, the manifest includes a link to one or more further manifests that the client should request to receive further portions of the requested video content.

The system configuration shown in FIG. 1 is an example configuration, which is chosen purely for the sake of conceptual clarity. Alternatively, any other suitable system configuration can be used. Generally, the different elements of system 100 may be implemented using software, hardware or a combination of hardware and software elements. In some embodiments, ad placement units 102 and/or router 104 comprise a general-purpose processor programmed in software to carry out the functions described herein. The software may be downloaded to the computer in optical or electronic form, over a network, for example, or it may, additionally or alternatively, be provided and/or stored on non-transitory tangible media, such as magnetic, optical, or electronic memory. Ad placement units 102 may be grouped together in a single location or even in a single package or may be distributed in separate locations, possibly separated by more than a kilometer or even more than 100 kilometers. Router 104 optionally comprises one or more interfaces 162 through which it connects to Internet 138 and clients 110. Additionally, router 104 comprises one or more interfaces 164 through which the router connects to ad placement units 102. Alternatively, the same interface is used to communicate with both clients 110 and ad placement units 102. Router 104 also comprises a processor 160, which carries out at least some of the tasks of the router.

In some embodiments, router 104 comprises a redirection router, which sends a redirection message to the client in response to the client manifest request. The redirection message causes the client to resend the request to the chosen ad placement unit 102. In some embodiments, the client requests are sent as HTTP requests and ad placement units 102 provide the manifests in accordance with the HTTP protocol. Optionally, in accordance with these embodiments, the redirection message comprises an HTTP redirection message.

In embodiments in which router 104 operates as a redirection router, the manifest with the advertisement links inserted into the avails is optionally provided to the client 110 by the ad placement unit 102 directly, without passing through router 104.

In other embodiments, router 104 comprises a proxy router, which forwards client requests to the corresponding chosen ad placement unit 102. In these embodiments, the manifest with the advertisement links inserted into the avails is provided back to router 104, which forwards the manifest back to the client 110.

Optionally, before forwarding a manifest to client 110, router 104, whether operating as a redirection router or as a proxy router, modifies any pointers therein that point to the ad placement unit 102, so that the modified pointers point to the router 104.

The one or more predefined rules on splitting the video requests between the ad placement units 102, include, in some embodiments, a predefined percentage distribution between the ad placement units 102. For example, router 104 may be configured to split the advertisement avails in a 70:30 distribution between two ad placement units 102.

The predefined percentage distribution may relate to the number of requests, the number of avails estimated to be in the video content referred to by the requests, the number of avails actually filled with advertisements, the number of advertisements viewed at least partially (sometimes referred to as ad impressions), the number of advertisements viewed to their completion, and/or any other suitable measure of assigned advertisements. Optionally, router 104 keeps track of the revenues received for the advertisements inserted to manifests by each of the ad placement units 102 and accordingly the requests are assigned to the ad placement units 102.

In some embodiments, the one or more predefined rules depend only on a single one of the above measures of the advertisements assigned to each ad placement unit 102. In other embodiments, the one or more predefined rules depend on a weighted sum or any other suitable function of a plurality of the above measures.

Optionally, router 104 keeps track of the number of requests forwarded to each of the ad placement units 102 and accordingly ad placement units 102 for subsequent requests are chosen. Alternatively or additionally, router 104 keeps track of the number of avails in the requests provided to each of the ad placement units 102.

In some embodiments, router 104 monitors the manifests transmitted from the ad placement units 102 to the clients 110, and collects statistics on the advertisements the manifests include. These statistics are optionally used in adjusting the selection of ad placement unit 102. In some embodiments, router 104 monitors information transmitted from the clients 110 on the actual ad impressions or ad completions (i.e., notifications that ads were displayed until their completion) and uses this information in managing the splitting of requests between ad placement units 102.

In some embodiments, the ad placement unit 102 to which a specific request is forwarded, is selected randomly with weights selected responsive to the tracked number of requests forwarded to each of the ad placement units 102. Alternatively, at each time point, the ad placement unit 102 whose proportion of assigned requests and/or avails is farthest from a predefined proportion assigned to the ad placement unit 102 is selected. In some embodiments, the router 104 selects the ad placement unit 102 that if selected will move the total average closest to the predefined percentage distribution.

In one embodiment, given as an example, router 104 is configured with a desired ratio $R_{pu}$ for each of the ad placement units 102, where PU designates an identification of the ad placement unit. In addition, router 104 keeps track of the number $AD_{pu}$ of avails delivered to each of the ad placement units 102 and of a total number of avails $AD_{tot}$ delivered to all the ad placement units 102. For each received request, router 104 selects an ad placement unit 102 with:

$$\max(R_{pu} - AD_{pu}/AD_{tot}).$$

In other embodiments, in addition to attempting to converge in the long run to the predefined percentage distribution, router 104 chooses corresponding ad placement units 102 for received requests, based on short term efficiency considerations. In some embodiments, for each received client request, router 104 determines for each ad placement unit 102 an efficiency score which indicates a current efficiency of handling the received request by the specific ad placement unit 102. The choosing of the ad placement unit 102 that is to handle a received request is performed at least partially responsive to the efficiency scores of the ad placement units 102.

The efficiency score is optionally a function of time. In some embodiments, router 104 manages for each ad placement unit 102 a record which indicates for the ad placement unit 102, the efficiency score for each time interval. For example, a first efficiency score value is assigned for work hours, a second efficiency score value is assigned for night hours and a third value is assigned for weekends and holidays. Alternatively or additionally, router 104 receives from the ad placement units 102 periodic updates on the load, percentage of avails being filled and/or any other efficiency parameters, and accordingly sets their current efficiency score.

In some embodiments, the efficiency score for each ad placement unit 102 is a function of a proximity between the client and the ad placement unit 102. In other embodiments, the efficiency score is a function of the current average revenue received by the ad placement unit 102 for placing advertisements in avails. Giving short term preference to an ad placement unit 102 currently achieving a high revenue per avail could increase the overall income of all the ad placement units 102. Alternatively or additionally, the efficiency score is a function of an average response time between receiving a request by the ad placement unit 102 and returning a manifest with inserted advertisement links. The response time could be indicative of the ease of the ad placement units 102 to fill avails with advertisements. Another parameter which is used in some embodiments in determining the efficiency, is advertisement metadata, such as advertisement type. Some types of advertisements are less preferred and therefore are indicative of low efficiency of the ad placement units 102 that use them.

In some embodiments, router 104 receives rules on types of ads that are to be preferred or avoided by specific clients and/or video content. In addition, router 104 monitors the types of ads currently provided by each of ad placement units 102, and accordingly assigns efficiency scores to the ad placement units 102.

Router 104 optionally chooses the ad placement unit 102 with the highest efficiency score to handle a received request, provided that the difference $(R_{pu} - AD_{pu})/AD_{tot}$ is not greater than a predetermined threshold. Alternatively, the ad placement unit 102 to handle each received request is selected using a function which takes both the efficiency score and the difference from the predefined ratio into account. In some embodiments, the selection of the ad placement unit 102 depends at least partially on user information about the user from which the request was received. Optionally, the data about the user is received from the user with the request. Alternatively or additionally, the data about the user is received from a data management platform 124. Alternatively, router 104 comprises a database (DB) 116 in which information about previous requests of users and/or clients is collected. When a request of a user is received, database 116 is consulted to retrieve information about the client and/or user from which the request was received and accordingly the ad placement unit 102 to receive the request is selected.

The user information used by router 104 in choosing an ad placement unit 102, includes, in some embodiments, demographic information, such as age, gender, education, profession and/or income level. Optionally, the user information comprises location information indicating the user's residence (e.g., postal code) and/or current location. Alternatively or additionally, the user information comprises information on shopping habits of the user and/or on purchase agreements for given periods, which are coming up for renewal. Such purchase agreements may relate, for example, to insurance, car lease and/or service agreements.

In some embodiments, the splitting of the requests between the ad placement units 102 is designed such that different requests from the same user and/or client are sent to different ad placement units 102, such that over time the client will be exposed to the advertisement pools of all the ad placement units 102. For example, when the requested video content is a live video stream (e.g., television channel), each manifest supplied to the client generally covers a short segment of the requested video content and the client repeatedly sends requests for further segments of the video content. Probe 104 optionally forwards requests relating to the same video stream to ad placement units 102 without relation to the fact that the requests relate to the same video stream. Alternatively, probe 104 gives preference to passing manifests belonging to the same video stream to different ad placement units 102. In other embodiments, however, requests for manifests relating to the same video content are transferred to the same ad placement unit 102, or preference is given to passing the requests to the same ad placement unit 102.

In some cases, different ad placement units 102 expect to receive client requests in different formats, or are more efficient when client requests are received in a specific preferred format of that specific ad placement unit 102. The different formats optionally differ in the metadata they expect to receive with the requests or in the format of the metadata they expect to receive.

In some embodiments, after choosing the ad placement unit 102 to receive a specific request, router 104 converts the specific request into the corresponding format of the chosen ad placement unit 102. The conversion may include addition of information to the request or removal of information from the request. Alternatively or additionally, the conversion includes modification of information in the request into a different format. For example, some ad placement units 102 expect to receive location information of the client in the format zip=ZIPCODE, while others expect the format location=ZIPCODE. Router 104 is optionally configured with the format required by each ad placement unit 102 and converts client requests to the required format.

Each of the ad placement units 102 optionally selects the advertisements to be placed in the avails according to its own rules, generally unrelated to the rules used by the other ad placement units 102. The different ad placement units 102 optionally select the advertisements from different advertisement pools and/or based on different business relationships. Optionally, different ad placement units 102 use different ad-sales strategies in selecting the advertisements. In some embodiments, the different ad placement units 102 use different metadata regarding the viewers in selecting the advertisements to insert to avails. The metadata may include, for example, age, gender and/or location. In some embodiments different ad placement units 102 use different metadata parameters. Optionally, different ad placement units 102 use different geographical granularities in selecting advertisements. For example, a first ad placement unit 102 may have different advertisement rules for different states, such that all clients from the same state generally receive the same advertisements, while a second ad placement unit 102 selects different advertisements for different cities or for different postal codes.

For example, one ad placement unit 102 may select advertisements based on location of the viewers, while another ad placement unit 102 may select advertisements based on demographic data associated with the viewers of a particular program. For example, the ad placement unit 102 may select for a specific video program known to attract young males, advertisements directed to 18-34 year old males.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method of providing a video manifest to a client, comprising:

managing, by a router, for each of a plurality of ad placement units, a numerical measure of advertisement avails provided by the router to the ad placement unit for filling with advertisements;

receiving, at the router, a client request for a video content;

choosing, by the router, an ad placement unit from the plurality of ad placement units, to select advertisements to be placed in avails of the requested video content, at least partially responsive to the managed measures of advertisement avails; and directing the received client request to the chosen ad placement unit-, wherein each of the plurality of ad placement units is assigned a predefined proportion assigned to the ad placement unit and wherein choosing the ad placement unit from the plurality of ad placement units comprises choosing responsive to the managed measures of advertisement avails and the assigned predefined proportions, and wherein choosing the ad placement unit from the plurality of ad placement units comprises choosing the ad placement unit for which the managed measure is farthest from the assigned predefined proportion.

2. The method of claim 1, wherein managing for each of the plurality of ad placement units, a measure of advertisement avails comprises counting the number of requests directed to each of the ad placement units.

3. The method of claim 1, wherein managing for each of the plurality of ad placement units, a measure of advertisement avails comprises counting the number of avails in the requests directed to each of the ad placement units.

4. The method of claim 1, wherein managing for each of the plurality of ad placement units, a measure of advertisement avails comprises counting the number of avails actually filled by each of the ad placement units.

5. The method of claim 1, wherein directing the received client request to the chosen ad placement unit comprises forwarding the client request from the router to the chosen ad placement unit.

6. The method of claim 1, wherein directing the received client request to the chosen ad placement unit comprises sending to a client from which the client request was received, a redirection instruction to forward the client request to the chosen ad placement unit.

7. The method of claim 1, wherein choosing the ad placement unit from the plurality of ad placement units comprises choosing responsive to current efficiency scores of the ad placement units.

8. The method of claim 1, wherein choosing the ad placement unit from the plurality of ad placement units comprises choosing at least partially responsive to information on the user from which the request was received.

9. The method of claim 1, wherein choosing the ad placement unit from the plurality of ad placement units comprises choosing in a manner giving preference to directing requests from a specific client to multiple ad placement units.

10. The method of claim 1, further comprising modifying a format of the received client request, before directing the received client request to the chosen ad placement unit.

11. The method of claim 7, wherein the current efficiency scores of the ad placement units are dependent on current income received by the ad placement units for filling avails.

12. The method of claim 7, wherein the current efficiency scores of the ad placement units are dependent on measures of current load on the ad placement units.

13. Apparatus for providing a video manifest to a client, comprising:
   at least one interface for communicating with a plurality of clients and a plurality of ad placement units; and
   a router configured to manage for each of the plurality of ad placement units, a numerical measure of advertisement avails provided by the router to the ad placement unit for filling with advertisements, to receive requests for video content from the clients, to choose for each received request an ad placement unit from the plurality of ad placement units, to handle the request, at least partially responsive to the managed measures of advertisement avails and to direct the received client request to the chosen ad placement unit,
   wherein each of the plurality of ad placement units is assigned a predefined proportion assigned to the ad placement unit and wherein the router is configured to choose the ad placement unit from the plurality of ad placement units responsive to the managed measures of advertisement avails and the assigned predefined proportions, and
   wherein the router is configured to choose the ad placement unit from the plurality of ad placement units by choosing the ad placement unit for which the managed measure is farthest from the assigned predefined proportion.

14. The apparatus of claim 13, wherein the router is configured to direct the received client request to the chosen ad placement unit by forwarding the client request from the router to the chosen ad placement unit.

15. The apparatus of claim 13, wherein the router is configured to direct the received client request to the chosen ad placement unit by sending to a client from which the client request was received, a redirection instruction to forward the client request to the chosen ad placement unit.

16. The apparatus of claim 13, wherein the router is configured to modify a format of the received client request, so as to match a format expected by the chosen ad placement unit, before directing the received client request to the chosen ad placement unit.

17. The apparatus of claim 13, wherein the router is configured to choose the ad placement unit from the plurality of ad placement units at least partially responsive to information on the user from which the request was received.

18. The apparatus of claim 13, wherein the router is configured to choose the ad placement unit from the plurality of ad placement units in a manner giving preference to directing requests from a specific client to multiple ad placement units.

* * * * *